US008977564B2

(12) United States Patent
Bushpala et al.

(10) Patent No.: US 8,977,564 B2
(45) Date of Patent: Mar. 10, 2015

(54) BILLING ACCOUNT REJECT SOLUTION

(71) Applicant: Bank of America Corporation, Charlotte, NC (US)

(72) Inventors: Poornima Bushpala, Hyderabad (IN); Vipul Seth, Noida (IN); Rajneesh Talwar, Gurgaon (IN); Venkatesh Naidu, Hyderabad (IN); Scott A. Field, Stanley, NC (US); Kathy S. Myers, Salisbury, NC (US); Wichuda Chewawong, Concord, CA (US); Vamshi Yeligepally, Sithaphalmandi (IN)

(73) Assignee: Bank of America Corporation, Charlotte, NC (US)

( * ) Notice: Subject to any disclaimer, the term of this patent is extended or adjusted under 35 U.S.C. 154(b) by 205 days.

(21) Appl. No.: 13/803,756

(22) Filed: Mar. 14, 2013

(65) Prior Publication Data

US 2014/0279319 A1 Sep. 18, 2014

(51) Int. Cl.

| | |
|---|---|
| ***H04M 15/00*** | (2006.01) |
| ***G07F 19/00*** | (2006.01) |
| ***G06Q 30/00*** | (2012.01) |
| ***G06Q 30/04*** | (2012.01) |

(52) U.S. Cl.

CPC .................................... *G06Q 30/04* (2013.01)

USPC ......................... 705/34; 705/26.1; 705/26.35

(58) Field of Classification Search

None

See application file for complete search history.

(56) References Cited

U.S. PATENT DOCUMENTS

2003/0130950 A1 * 7/2003 Ahles ............................ 705/45

* cited by examiner

*Primary Examiner* — Paul Danneman

(74) *Attorney, Agent, or Firm* — Weiss & Arons LLP; Michael A. Springs, Esq.

(57) ABSTRACT

Apparatus for coordinating a rule-based relationship between a bank, a vendor and a merchant is provided. The apparatus may include a first receiver configured to receive an employee identification number input into a graphical user interface ("GUI"). The apparatus may additionally include the first receiver being configured to receive a billing account number input into the GUI. The apparatus may also include a processor configured to determine if the billing account number includes a number of consecutive, identical digits. The processor may further be configured to determine if the number of consecutive, identical digits is equal to or greater than a threshold number of consecutive, identical digits.

13 Claims, 5 Drawing Sheets

BILLING ACCOUNT REJECT SOLUTION

FIELD OF TECHNOLOGY

This invention relates to systems and methods for establishing and maintaining data integrity. Specifically, this invention relates to establishing and maintaining customer data integrity.

BACKGROUND OF THE DISCLOSURE

Many large businesses use highly automated billing platforms to bill their customers. These platforms usually receive customer billing data during predetermined time intervals. The customer data is subsequently used by the billing platforms for customer billing.

A billing platform is typically unable to process incomplete billing data. For example, a billing platform is unable to process a customer bill if the customer's bank account number is inaccurate or missing. The billing platform's failure to process the bill will result in a billing reject.

Billing rejects are highly undesirable for a business. This is at least because rejected bills may need to be analyzed by business personnel for root cause identification and correction. Root cause identification is typically difficult, making a manual review process both time consuming and complex. Billing rejects are further undesirable for a business because they result in lost business revenue.

It would be desirable, therefore, to provide systems and methods for establishing a high level of data integrity for customer data input into one or more customer databases. It would be additionally desirable to provide systems and methods for maintaining a high level of data integrity for customer data stored in one or more customer databases. This is desirable at least because accurate customer data assists in ensuring that a billing platform receives complete and accurate billing data, reducing a total number of billing rejects.

SUMMARY OF THE DISCLOSURE

Systems and methods are provided for validating an account number. The method may include using a first receiver to receive an employee identification number input into a graphical user interface ("GUI"). The method may also include using the first receiver to receive a billing account number input into the GUI. The method may additionally include using a processor to determine if the billing account number includes a number of consecutive, identical digits. In some embodiments, the method may further include using the processor to determine if the number of consecutive, identical digits is equal to or greater than a threshold number of consecutive, identical digits.

In the event that the number of consecutive, identical digits is determined to be greater than or equal to the threshold number, the method may include using a transmitter to transmit a data file including the employee identification number and the billing account number to a predetermined e-mail address.

In the event that the number of consecutive, identical digits is determined to be less than the threshold number, the method may include using the processor to access a database including valid billing account numbers. The method may also include using the processor to electronically identify an account number included in the database that is identical to the billing account number. A failure to identify an account number identical to the billing account number may triggers the processor to disable a plurality of input fields included in the GUI.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION OF THE DISCLOSURE

Figure 1:
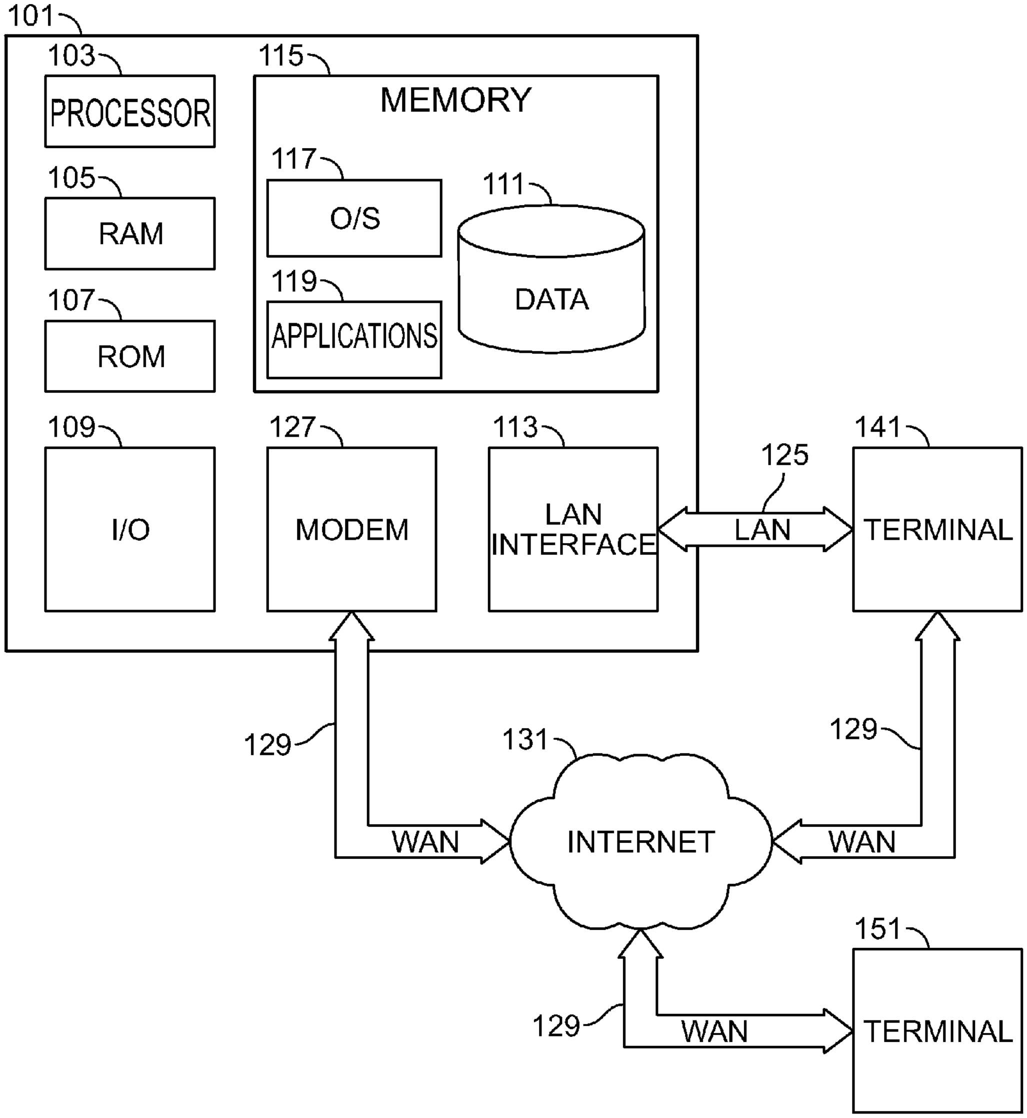
FIG. 1 shows apparatus that may be used in accordance with the systems and methods of the invention.

The systems and methods of the invention include a graphical user interface (hereinafter, "GUI") and a preventative monitoring solution. The GUI and the preventative monitoring solution may assist in establishing the accuracy of data input in one or more customer databases. The GUI and the preventative monitoring system may additionally assist in maintaining the integrity of data input into, and stored in, one or more customer databases.

It should be noted that, in some embodiments, the data stored in the customer database(s) may be retrieved and transmitted to a billing platform subsequent to the data storage. It should be noted that data may include one or more of types of billing data, such as one or more customer billing account numbers, service codes and/or volume numbers associated with each of the service codes.

The billing platform may use the data to bill customers. For example, a retail store, a financial institution, a supplier or a distributor may use the billing platform for customer billing.

A GUI According to the Invention

The GUI according to the invention may be configured to receive, or modify, customer data, an employee identification number, and/or any other suitable data. The GUI may ensure the integrity of the data input into the GUI. In some embodiments, the GUI may execute one or more algorithmic or comparison-based functions to assess the input data's integrity. It should be noted that the functions executed by the GUI may be performed using one or more hardware-based processors, transmitters, receivers, and/or any other suitable hardware.

A. Account Number Verification and Bank Number Verification

In some embodiments, the GUI may be used to verify an account number input into the GUI. The account number may identify a customer bank account number (referred to alternatively hereinafter as an "account number"). The account number may be a bank account number that will used by a billing platform to bill a customer at a later point in time (referred to alternatively hereinafter as a "billing account") or any other bank account number.

Upon input of an account number into a GUI according to the systems and methods of the invention, the GUI may execute a preliminary accuracy determination. The preliminary determination may determine if the input account number includes a number of consecutive, identical numerical digits that is equal to or greater than a threshold number of consecutive, identical numerical digits (referred to alternatively hereinafter as a "threshold value"). The threshold value may be any integer number of digits, such as three digits, four digits, five digits, six digits, seven digits, or any other suitable integer number of digits.

In the event that the input account number includes a number of consecutive, identical digits that is equal to or greater than the threshold value, the GUI may automatically clear the input account number, generate a display requesting the input of an accurate account number, and/or disable one or more GUI functionalities until an accurate account number is input. For example, the GUI may disable a functionality that allows a user to input information into one or more displayed input fields. This disabling may be referred to alternatively as 'disabling the input fields.' In some embodiments, one or more of the disabled input field may be required input fields.

Additionally, or alternatively, the GUI may generate and transmit an electronic communication to a managing department, identifying the user of the GUI who input the invalid account number, the invalid account number, and/or any other suitable information. In some embodiments, the identification of the user of the GUI may include an employee identification number input into the GUI by the user. The electronic communication may be an e-mail. In some embodiments, the e-mail may be sent to an e-mail address of one or more employees in the management department.

In some embodiments, the GUI may determine the accuracy of the input account number as the account number is being keyed in to the GUI. For example, as each digit of the account number is received by the GUI, the GUI may execute a look-up table analysis of a table that includes valid account numbers, and determine if the digits entered are included in a valid account number.

Additionally, the GUI may pre-fill the remainder of the input field based on each digit entered. In some embodiments, the GUI may pre-fill the remaining fields only after a predetermined integer number of digits have been entered in to the GUI. The pre-fill may be based on the table of valid account numbers. In some of these embodiments, in the event that a keyed-in digit is determined to be, the pre-fill may stop and an error message may be displayed, including text 'Invalid Billing Account.'

In other embodiments, subsequent to, or in place of, the preliminary accuracy determination, the GUI may receive a complete account number and then determine the account number's accuracy. In exemplary embodiments, the GUI may determine the accuracy of the account number by accessing a data file that includes a list of valid account numbers. The GUI may subsequently execute a table look up function. The table look up function may determine if there is an entry in the data file that corresponds to the input account number. In some embodiments, the GUI may also use the data file to determine what account analysis platform the account number belongs to. The GUI may then determine if an account analysis platform associated with the account number is the same account analysis platform identified in the data file. In the event that the two platforms differ, the GUI may overwrite the account analysis platform currently associated with the account number with the account analysis platform identified in the data file.

Alternatively, the GUI may execute one or more algorithms to determine if the input account number is an accurate account number. For example, the GUI may determine if the input account number satisfies a predetermined equation for valid input account numbers. Alternatively, the GUI may determine if a routing and transit number included in the account number is valid by determining if the routing and transmit number satisfies a predetermined equation for valid routing and transit numbers.

The GUI may use an additional, or alternative, method to establish the accuracy of an input account number. In some embodiments, this method may also include determining the accuracy of an input bank number associated with the input account number. For the purposes of this invention, a bank number may be a number that identifies a financial institution and/or a portion of a financial institution.

In these embodiments, the GUI may first establish the accuracy of a bank number input into the GUI. The GUI may establish the accuracy of the bank number by accessing a data file including a list of valid bank numbers and determining if there is an entry corresponding to the input bank number. The GUI may subsequently determine the accuracy of the input account number based at least in part on the bank number. The GUI may execute this determination by accessing one or more data files that list an allowable range of account numbers associated with the bank number and/or accessing a list of active account numbers associated with the bank number. The GUI may additionally, or alternatively, run one or more algorithms and determine if the input account number satisfies the algorithm(s) that identify the valid account numbers associated with the input bank number.

It should be noted that, in some embodiments, a valid bank number may be any bank number associated with a single financial institution. In these embodiments, each valid bank number may identify a bank market, a segment of the bank, and/or a bank regional location. In other embodiments, a valid bank number may be any active bank number that identifies one of a plurality of financial institutions.

In some embodiments, subsequent to the input of an account number in a GUI according to the systems and methods of the invention, the GUI may disable one or more GUI functionalities. For example, the GUI may restrict the input of additional data into one or more GUI input fields until the account number is verified. Upon verification of the account number, the GUI may enable a user to input data into one or more input fields.

In some embodiments, the GUI may enable data input into one or more data fields during account number verification. However, the GUI may suspend the issuance of a final approval of a customer billing account, and/or generating a verification number relating to the establishment of a customer billing account, until the completion of the account number verification.

In the event that an input account number is determined to be inaccurate, the GUI may substantially immediately thereafter restrict the input of data into one or more data fields. For example, the GUI may restrict data input into all input fields except for an input field configured to receive an account number. In the event that an account number is input into the appropriate data fields and is determined to be accurate, the GUI may re-establish a user's permissions to input data into the remaining data fields. It should be noted that, in some embodiments, one or more of the input fields may be input fields that are required to be populated with data, in order for a user to set up a customer billing account.

The GUI according to the systems and methods of the invention may additionally, or alternatively, include one or more additional functionalities. The additional functionalities may assist in ensuring data integrity, issue spotting and issue resolution. In some embodiments, the additional functionalities may be generated by the GUI after an account number input into the GUI is determined to be inaccurate.

A first additional functionality may include displaying one or more valid account numbers to be input into the GUI. The GUI may identify the valid account numbers to be displayed based at least in part on selecting valid account numbers similar to the invalid account number. For example, the GUI may access one or more data files including data entries that identify some or all valid account numbers. The GUI may subsequently determine which entries have a highest degree of similarity to the invalid account number, based on a number of similar digits and/or a number of transposed digits.

A second additional functionality may include displaying one or more alerts, pop-up windows, or graphical displays. The alert(s) may warn that the input account number has been determined to be invalid. The pop-up windows, or graphical displays, may contain information advising a user how to obtain a correct account number, and/or contact information of business associates qualified to provide assistance.

A third additional functionality may include a first data input field and a second data input field. The first data input field may request a first account number. The second data input field may request a second account number. In some embodiments, both the first account number and the second account number may be transmitted to a billing platform for customer billing purposes. The billing platform may use the first billing account number for customer billing. However, in the event that the first billing account is determined to be inactive, contain insufficient funds, or invalid for any reason, the billing platform may automatically bill the second billing platform. The automated billing of the second billing platform may be generated in place of a conventional billing reject.

B. Account Closure

The GUI may additionally impose one or more restraints and/or conditions on the closing of a customer account. These restraints and/or conditions may require the establishment of an alternate customer billing account in the event that the account being closed is a billing account. These restraints and/or conditions may additionally, or alternatively, assist in ensuring the complete deactivation of all services associated with the customer account.

In some embodiments, a GUI may receive a request to delete a customer account. The GUI may substantially immediately thereafter query a database to determine if the customer account is being used for customer billing. In the event that the customer account is determined to be currently in use for customer billing (referred to alternatively as a 'billing account'), the GUI may generate a warning message including text. The text may explain that this account is an active billing account. The text may additionally explain that a replacement account number is required, prior to deletion of the account. The GUI may additionally, or alternatively, require the receipt of an alternate, valid account number prior to closing the account.

In some embodiments, the GUI may suspend one or more GUI functionalities such as input characteristics associated with one or more data fields, until the GUI receives an alternate, valid account number. The GUI may additionally, or alternatively, suspend the electronic closure of the customer account until the GUI has received information relating to an alternate, valid account number. It should be noted that one or more of the systems and methods for verifying an account number may be used for verifying the accuracy of the alternate account number.

In other embodiments, in the event that the customer account is closed prior to the receipt of a valid, alternate account number, the GUI may transmit an electronic message to a predetermined e-mail address, including text identifying the account closed and the need for an alternate billing account number.

For example, a user may attempt to close a customer account that is used for customer billing. In the event that the user attempts to save the GUI screen that deleted the billing account, the GUI may generate a text box requesting the input of an alternate, valid account number. In some embodiments, the GUI may subsequently block the user from proceeding with the deletion of the account until the GUI has received an alternate, valid billing account number.

Additionally or alternatively, after receiving a request to delete a customer account, the GUI may substantially immediately thereafter query a database to determine if the customer account is associated with one or more active services. In the event that the customer account is associated with one or more active services, the GUI may generate a warning message including text. The text may explain that this account is associated with active services. The GUI may additionally, or alternatively, require that each active service be deleted prior to the closing of the account. In some embodiments, the GUI may suspend the electronic closure of the customer account until the GUI has received information relating to the alternate account number.

In additional embodiments, in response to a request to close a customer account, the GUI may automatically delete all active services associated with the customer account.

A Preventative Monitoring System According to the Invention

The systems and methods of the invention may additionally include a preventative monitoring system. The preventative monitoring system may assist in maintaining and, in some embodiments, enhancing the data integrity of one or more customer databases. It should be noted that, in some embodiments, the preventative monitoring system may be an integral portion of the GUI according to the systems and methods of the invention.

For example, in some embodiments, the preventative monitoring system may loop through one or more customer data files, analyzing customer data included in the files and determining the validity, or invalidity, of one or more pieces of data stored in the customer file. Additionally, or alternatively, the preventative monitoring system may analyze data fields, data spreadsheets, and/or any other suitable data files.

In the event that data is determined to be invalid, the preventative monitoring system may take one or more forms of preventative action and/or corrective action. It should be noted that, in some embodiments, the preventative monitoring system may perform one or more data integrity analyses of customer data prior to the transmission of the customer data to a billing platform.

A. Service Code Analysis

In some embodiments, the preventative monitoring system may assess the validity of one or more service codes stored in one or more customer databases.

For the purposes of this invention, a service code may be a code that identifies a service provided to a customer. The service associated with the service code may have a daily, weekly, monthly, bi-monthly, quarterly or yearly fixed charge. A service code according to the invention may include a volume number associated with the service code. The volume number may identify the number of times that the service was provided to the customer during a predetermined time period.

In some of these embodiments, a business may bill a customer for provided services which are associated with a service code. The business may bill the customer for an amount that is equal to, or includes, the resultant of the following equation: P*V, in which P corresponds to the cost of providing the service to the customer, and V corresponds to the number of times that the service was provided to the customer during the predetermined time period.

For example, a service code may be a subscription to a particular service, such as information reporting for a bank account. This service code may have a monthly fixed charge of twenty-five (25) dollars per month. In this exemplary embodiment, the volume number associated with the service code may specify the number of bank accounts that are being provided with the information reporting service. If the customer has five (5) accounts that are being provided with the information reporting service, the business may bill the customer a total of (25)*(5)=125 dollars every month for providing the information reporting service.

The preventative monitoring system may use one or more processors to execute one or more algorithms. At least a portion of the algorithms may assist the preventative monitoring system in determining the validity of service code data stored in one or more customer databases.

An exemplary determination executed by the preventative monitoring system may including calculating the value of P*V for one or more service codes stored in a customer database. The preventative monitoring system may calculate this equation separately for each service code. The preventative monitoring system may subsequently determine, for each service code, if $P*V \geq T$, where T is a threshold value associated with the service code. In some embodiments, T may correspond to a maximum billing value expected for the service code being analyzed.

In the event that P*V is greater than, or equal to, T, the preventative monitoring system may transmit data relating to the customer account, the service code, the volume number, and/or the billing amount to a business employee for review. Additionally, in some embodiments, the preventative monitoring system may suppress transmission of billing data associated with the service code until the issue is resolved. In some of these embodiments, the customer may be billed for the service during a later billing cycle in the event that the business employee is unable to resolve the root cause of the unexpected billing amount prior to running an earlier billing cycle. These systems and methods may assist in reducing a total number of rejected bills. These systems and methods may additionally transform issue resolution from a reactive state to a proactive state.

The preventative monitoring system may additionally, or alternatively, access a customer identifier associated with a customer. The customer identifier may identify the customer as being a strictly domestic customer or a strictly international customer. In the event that the preventative monitoring system determines that a customer is an international customer, the preventative monitoring system may assess if any billing codes, including service codes and action codes, associated with the customer are domestic billing codes. If the preventative monitoring service determines that the international customer has one or more domestic billing codes stored in his customer data, the service may substantially immediately transmit information relating to the customer and/or the billing code(s) to a business employee for review. Additionally, during a subsequent billing cycle, the preventative monitoring system may suppress transmission of all billing data associated with the domestic services until the issue is resolved. In some of these embodiments, the customer may be billed the following month for services not billed during a previous billing cycle.

The preventative monitoring solution may additionally delete selected service record data for one or more customers. For example, the preventative monitoring solution may delete selected service record data such as service record data that includes activity data but is not associated with a billing code.

The preventative monitoring system may additionally, or alternatively, analyze billing codes stored in customer service records. The preventative monitoring system may execute this analysis for each billing code. This analysis may include accessing one or more billing code lists that identify all active billing codes. The analysis may also include determining, for each billing code, if the billing code lists include an entry identical to the billing code.

For each billing code not found in the billing code list(s), the preventative monitoring system may electronically generate one or more warning messages, detailing the billing codes and, in some embodiments, their unidentified status. In some embodiments, in the event that more than a threshold number of billing codes do not have identical entries in the billing code list(s), the preventative monitoring solution may generate an electronic request to management, requesting an update of the billing code list(s).

B. Data Feed

The preventative monitoring service may additionally evaluate a setting, associated with a customer billing account, which specifies a billing platform that will process the customer's bills. In some embodiments, the preventative monitoring service may utilize tables that include a list of active account numbers associated with each billing platform. In these embodiments, the preventative monitoring service may determine if a customer account number associated with billing platform 'A' is included in billing platform 'A's' list of active account numbers.

In the event that billing platform 'A' does not include the account number of the account configured to send billing data to billing platform 'A,' the preventative monitoring service may generate an exception report. The exception report may list all customer accounts that include invalid billing settings. In some embodiments, the preventative monitoring system may suppress billing customer with improper billing settings until the matter has been resolved.

For example, a GUI may first determine the accuracy of a received account number using a table look up function. The GUI may subsequently use the table look up function to identify a billing platform that the account number belongs to. The GUI may then compare the billing platform associated with the account number to the billing platform identified in the look up table. In the event that the two platforms differ, the GUI may replace the billing platform currently associated with the account number with the billing platform identified in the data file.

C. Periodic Information Maintenance

The preventative monitoring service may additionally generate and analyze weekly or monthly reports. These reports may be analyzed prior to sending out customer billing information to one or more billing platforms.

In some embodiments, the preventative monitoring system may generate and/or access a report that includes all active billing account numbers. The preventative monitoring system may subsequently compare the active billing account numbers to customer billing account numbers included in customer database(s). The preventative monitoring system may identify all customer billing account numbers that do not have identical entries in the report. The preventative monitoring system may then electronically generate an exception report that identifies all customer account numbers that are no longer active. The preventative monitoring may additionally, or alternatively, repress all billing activity of customer accounts with inactive billing account numbers until the matter has been resolved.

Illustrative embodiments of apparatus and methods in accordance with the principles of the invention will now be described with reference to the accompanying drawings, which form a part hereof. It is to be understood that other embodiments may be utilized and structural, functional and procedural modifications may be made without departing from the scope and spirit of the present invention.

As will be appreciated by one of skill in the art upon reading the following disclosure, the GUI and/or the preventative monitoring system may be embodied as a method, a data processing system, or a computer program product. Accordingly, the GUI and/or the preventative monitoring system may take the form of an entirely hardware embodiment, an entirely software embodiment or an embodiment combining software and hardware aspects.

Furthermore, the GUI and/or the preventative monitoring system may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof. In addition, various signals representing data or events as described herein may be transferred between a source and a destination in the form of electromagnetic waves traveling through signal-conducting media such as metal wires, optical fibers, and/or wireless transmission media (e.g., air and/or space).

In an exemplary embodiment, in the event that the GUI and/or the preventative monitoring system is embodied at least partially in hardware, the GUI and/or the preventative monitoring system may include one or more databases, receivers, transmitters, processors, modules including hardware and/or any other suitable hardware. Furthermore, the operations executed by the GUI and/or the preventative monitoring system may be performed by the one or more databases, receivers, transmitters, processors and/or modules including hardware.

FIG. 1 is a block diagram that illustrates generic computing device 101 (alternatively referred to herein as a "server") that may be used according to an illustrative embodiment of the invention. The computer server 101 may have a processor 103 for controlling overall operation of the server and its associated components, including RAM 105, ROM 107, input/output module 109, and memory 115.

Input/output ("I/O") module 109 may include a microphone, keypad, touch screen, and/or stylus through which a user of server 101 may provide input, and may also include one or more of a speaker for providing audio output and a video display device for providing textual, audiovisual and/or graphical output. Software may be stored within memory 115 and/or storage to provide instructions to processor 103 for enabling server 101 to perform various functions. For example, memory 115 may store software used by server 101, such as an operating system 117, application programs 119, and an associated database 111. Alternatively, some or all of server 101 computer executable instructions may be embodied in hardware or firmware (not shown). As described in detail below, database 111 may provide storage for information input into the GUI and/or any other suitable customer information.

Server 101 may operate in a networked environment supporting connections to one or more remote computers, such as terminals 141 and 151. Terminals 141 and 151 may be personal computers or servers that include many or all of the elements described above relative to server 101. The network connections depicted in FIG. 1 include a local area network (LAN) 125 and a wide area network (WAN) 129, but may also include other networks. When used in a LAN networking environment, computer 101 is connected to LAN 125 through a network interface or adapter 113. When used in a WAN networking environment, server 101 may include a modem 127 or other means for establishing communications over WAN 129, such as Internet 131. It will be appreciated that the network connections shown are illustrative and other means of establishing a communications link between the computers may be used. The existence of any of various well-known protocols such as TCP/IP, Ethernet, FTP, HTTP and the like is presumed, and the system can be operated in a customer-server configuration to permit a user to retrieve web pages via the World Wide Web from a cloud-based server. Any of various conventional web browsers can be used to display and manipulate data on web pages.

Additionally, application program 119, which may be used by server 101, may include computer executable instructions for invoking user functionality related to communication, such as email, short message service (SMS), and voice input and speech recognition applications.

Computing device 101 and/or terminals 141 or 151 may also be mobile terminals including various other components, such as a battery, speaker, and antennas (not shown).

A terminal such as 141 or 151 may be used by a user of the systems and methods of the invention to access and input information into the GUI and/or the preventative monitoring system. Information input into the GUI and/or the preventative monitoring system may be stored in memory 115. The input information may be processed by an application such as one of applications 119.

FIGS. 2-5 illustrate exemplary processes that may be used in accordance with the systems and methods of the invention. It should be noted that the exemplary processes illustrated in FIGS. 2-5 are for illustrative purposes only. Each of the steps included in FIGS. 2-5 are optional, and may be deleted, modified, and/or generated in an order different from the order illustrated. Furthermore, one or more steps not illustrated in FIGS. 2-5 but described herein may be added to the processes detailed in FIGS. 2-5.

Additionally, it should be noted that each of the steps included in FIGS. 2-5 may be executed by one or more receivers, transmitters, processors, and/or any other suitable hardware.

Figure 2A:
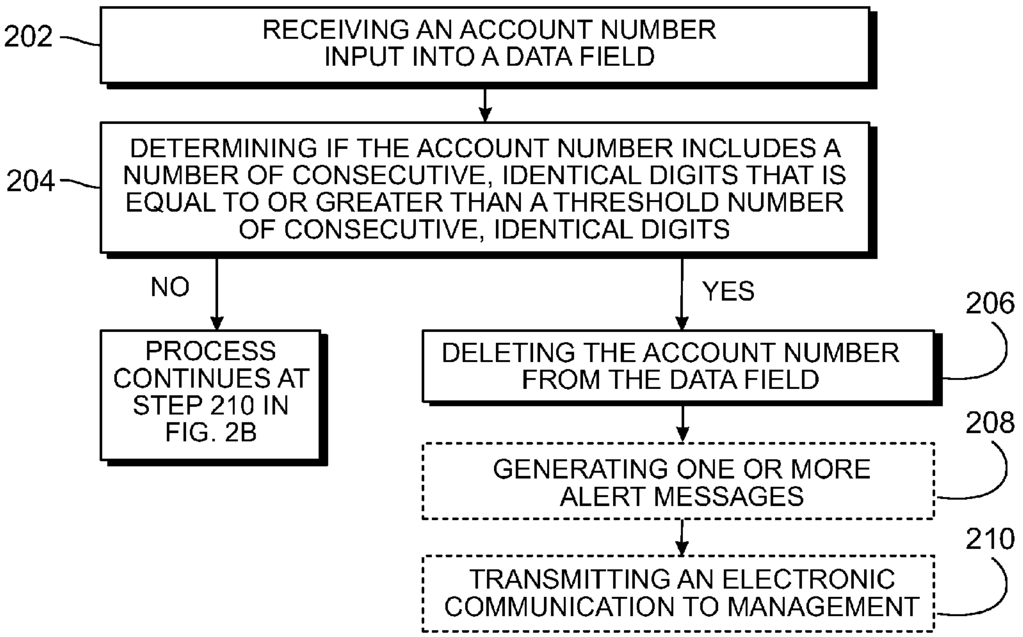
FIG. 2A shows a flow diagram of a process that may be used in accordance with the systems and methods of the invention.

FIG. 2A illustrates a flow diagram of an exemplary process that may be used in accordance with the systems and methods of the invention. The illustrative process detailed in FIG. 2A may include one or more of steps 202-210.

The process illustrated in FIG. 2A may include, at step 202, receiving an account number input into a data field. It should be noted that, for the purposes of the invention, a data field may be used interchangeably with the term input field.

The process may include, at step 204, determining if the account number includes a number of consecutive, identical digits, that is equal to or greater than a threshold number of consecutive, identical digits. In the event that the account number does not include a threshold number of consecutive, identical digits, that is equal to or greater than a threshold number of consecutive, identical digits, the process may continue at step 210 in FIG. 2B.

In the event that the account number does include a number of consecutive, identical digits that is equal to or greater than the threshold number of consecutive, identical digits, the process may continue at step 206. At step 206, the process may include deleting the account number from the data field. The process may optionally include steps 208 and 210. At step 208, the process may include generating one or more alert messages. At step 210, the process may include transmitting an electronic communication to management.

Figure 2B:
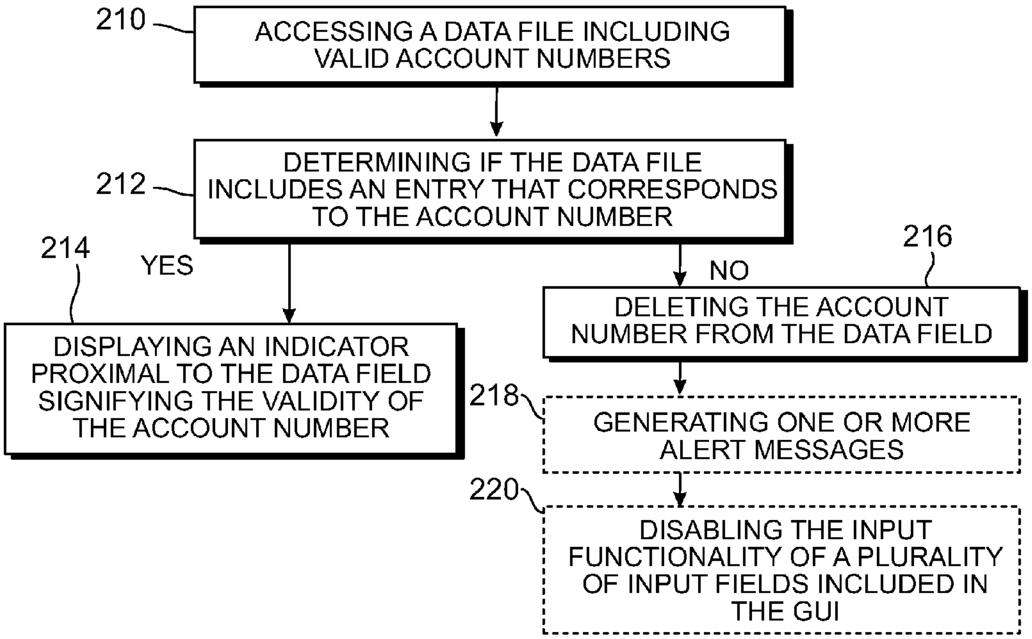
FIG. 2B shows a flow diagram of a process that may be used in accordance with the systems and methods of the invention.

FIG. 2B illustrates a flow diagram of an exemplary process that may be used in accordance with the systems and methods of the invention. The illustrative process detailed in FIG. 2B may include one or more of steps 210-220.

At step 210, the process may include accessing a data field including valid account numbers. At step 212, the process may include determining if the data file includes an entry that corresponds to the account number. If the data file does include an entry that corresponds to the account number, the process may continue at step 214. At step 214, the process may include displaying an indicator proximal to the data field, signifying the validity of the account number.

If the data file does not include an entry corresponding to the account number, the process may include, at step 216, deleting the account number from the data field. The process may additionally include steps 218 and 220. Step 218 may include generating one or more alert messages. Step 220 may include disabling the input functionality of a plurality of input fields included in the GUI. The GUI may be the GUI displaying the data field.

Figure 3:
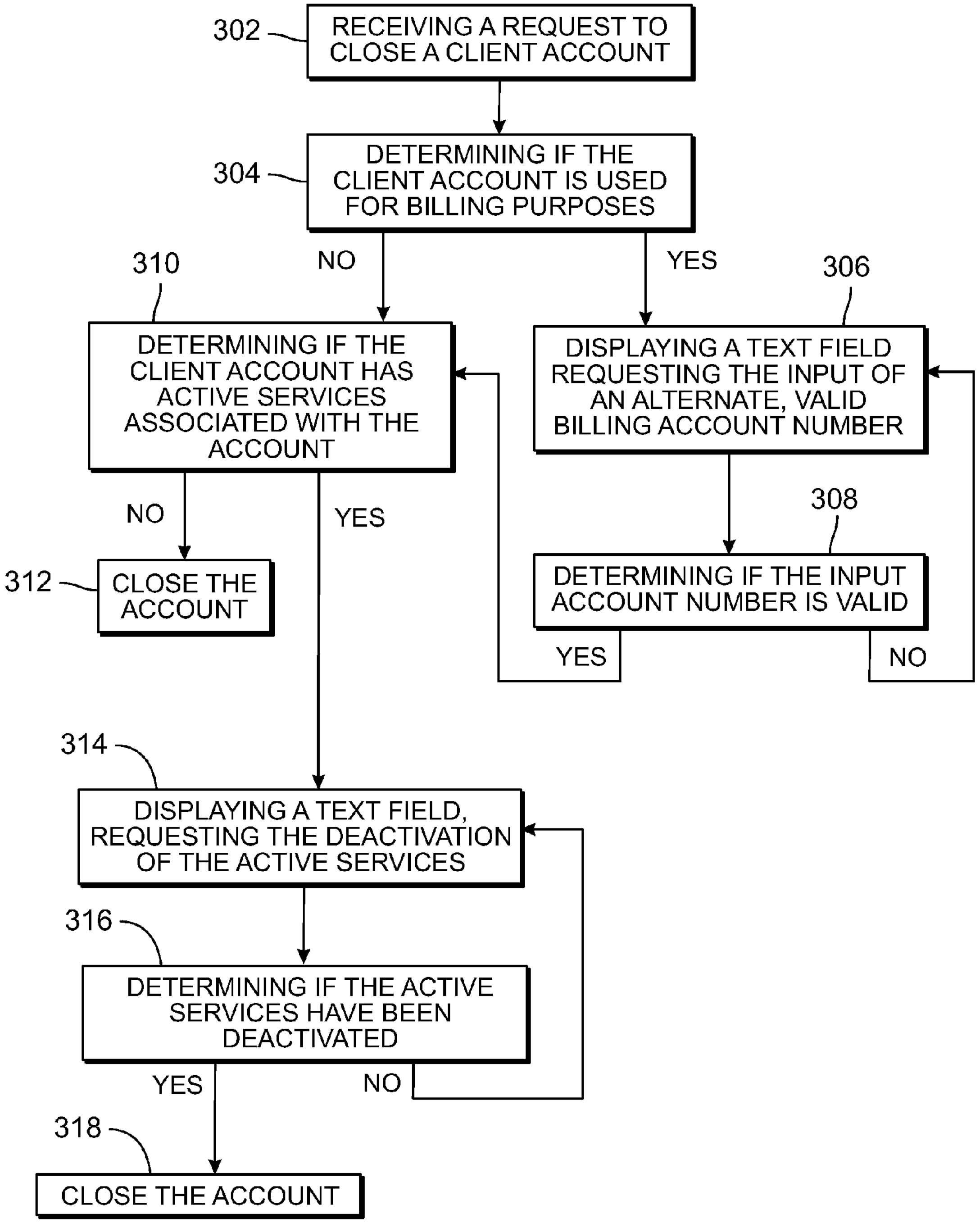
FIG. 3 shows a flow diagram of a process that may be used in accordance with the systems and methods of the invention.

FIG. 3 illustrates a flow diagram of an exemplary process that may be used in accordance with the systems and methods of the invention. The illustrative process detailed in FIG. 3 may include one or more of steps 302-318.

Step 302 may include receiving a request to close a client account. Step 304 may include determining if the client account is used for billing purposes. In the event that the client account is determined to be used for billing purposes, the process may include, at step 306, displaying a text field requesting the input of an alternate, valid billing account number. The process may additionally include, at step 308, determining if the input account number is valid. If the input account number is determined to be invalid, the process may return to step 306.

If the input account number is determined to be valid at step 308, or if the client account is determined not to be used for billing purposes at step 304, the process may continue at step 310. Step 310 may include determining if the client account has active services associated with the account. In the event that no active services are determined to be associated with the account, the process may include closing the account at step 312.

In the event that active services are determined to be associated with the account, the process may include displaying a text field, requesting the deactivation of the active services, at step 314. The process may subsequently include, at step 316, determining if the active services have been deactivated. This determining may be initiated upon the lapse of one or more predetermined time periods, and/or after a user has taken one or more predetermined forms of action in the GUI.

In the event that the active services have been determined to be deactivated, the process may include closing the account at step 318. In the event that the services are determined not to be deactivated, the process may return to step 314.

Figure 4:
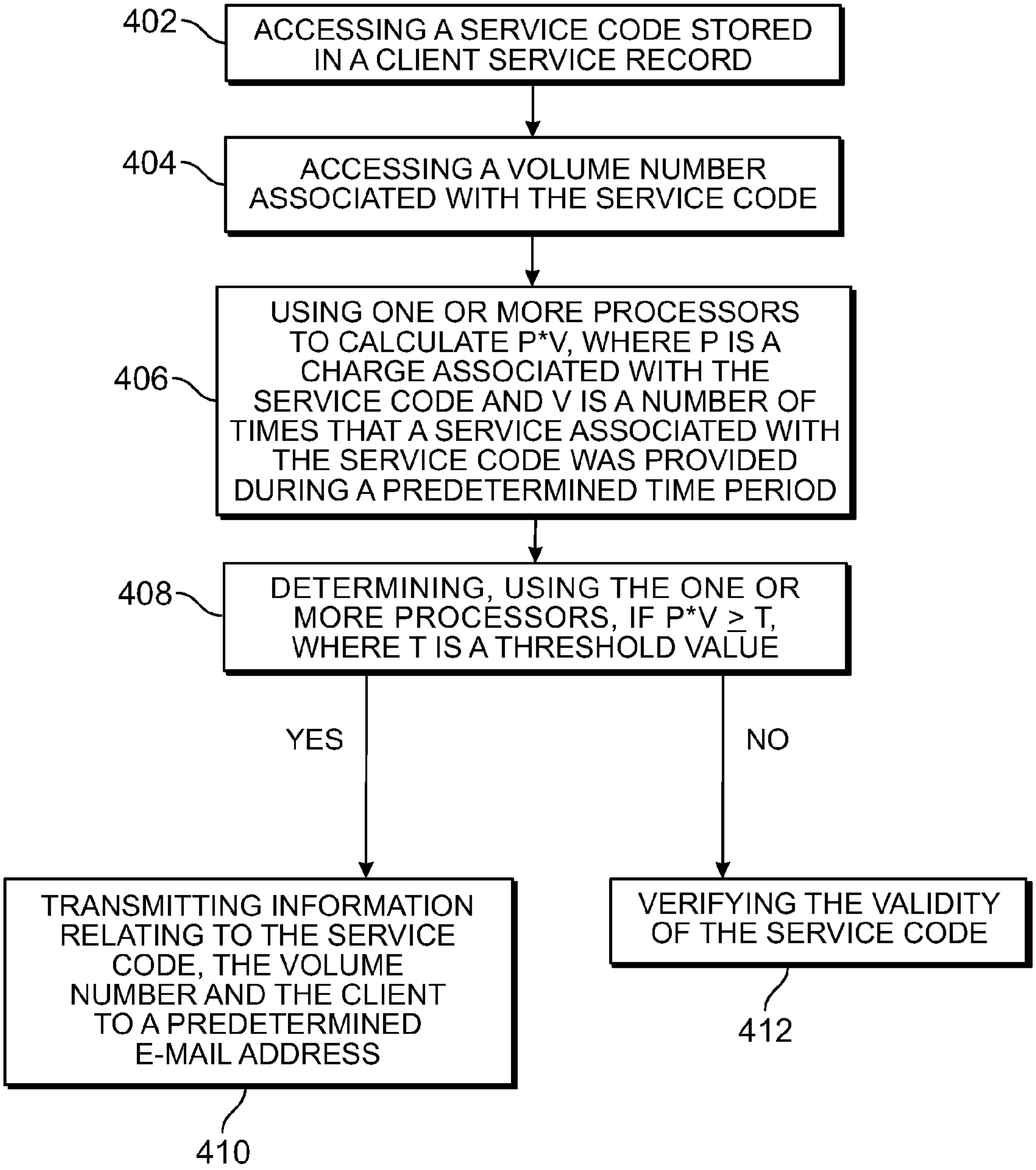
FIG. 4 shows a flow diagram of a process that may be used in accordance with the systems and methods of the invention.

FIG. 4 illustrates a flow diagram of an exemplary process that may be used in accordance with the systems and methods of the invention. The illustrative process detailed in FIG. 4 may include one or more of steps 402-412.

The process may include, at step 402, accessing a service code stored in a client service records. The process may additionally include, at step 404, accessing a volume number associated with the service code. At step 406, the process may include using one or more processors to calculate the value $P*V$, where P is a charge associated with the service code and V is a number of times that a service associated with the service code was provided during a predetermined time period.

At step 408 the process may include determining, using the one or more processors, if $P*V \geq T$, where T is a threshold value. In the event that $P*V \geq T$, the process may include, at step 410, transmitting information relating to one or more of the service code, the volume number and the client to a predetermined e-mail address. It should be noted that in other embodiments, this information may be electronically added to one or more spreadsheets, stored, and optionally transmitted at a later point in time.

In the event that $P*V<T$, the process may include, at step 412, verifying the validity of the service code.

Figure 5:
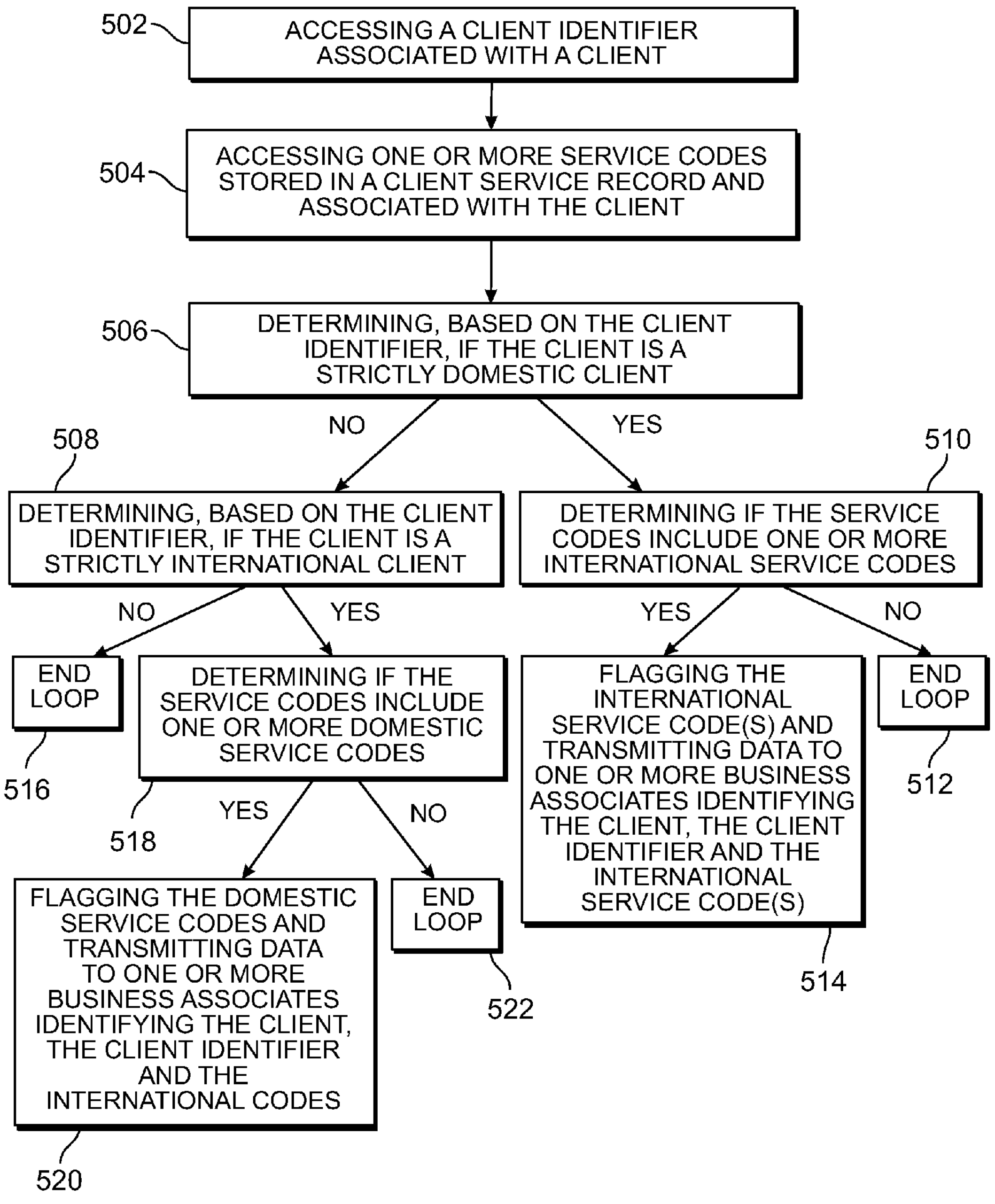
FIG. 5 shows a flow diagram of a process that may be used in accordance with the systems and methods of the invention.

FIG. 5 illustrates a flow diagram of an exemplary process that may be used in accordance with the systems and methods of the invention. The illustrative process detailed in FIG. 5 may include one or more of steps 502-522.

At step 502, the process may include accessing a client identifier associated with a client. At step 504, the process may include accessing one or more service codes stored in a client service record and associated with the client. At step 506, the process may include determining, based on the client identifier, if the client is a strictly domestic client.

In the event that the client is determined to be a strictly domestic client, the process may continue at step 510. Step 510 may include determining if the service codes include one or more international service codes. It should be noted that this determining may include querying a list of client service codes for one or more identifiers that identify a service code as being an international service code. For example, this query may include searching a numerical identifier associated with, or comprising, the service code, for one or more predetermined digits, letters, and/or combinations of digits and letters.

In the event that the service code is determined not to include one or more international service codes, the process may end at step 512. In the event that the service code is determined to include one or more international service codes, the process may include, at step 514, flagging the international service code(s) and transmitting data to one or more business associates identifying the client, the client identifier and the international service code(s).

In the event that the client is determined not to be a strictly domestic client, at step 506, the process may continue at step 508. Step 508 may include determining, based on the client identifier, if the client is a strictly international client. It should be noted that the determination of whether a client is a strictly international or a strictly domestic client may be executed by searching one or more client files for an identifier that identifies that client as a strictly international client or a strictly domestic client.

In the event that the client is determined not to be a strictly international client at step 508, the process may end at step 516. In the event that the client is determined to be a strictly international client, the process may continue at step 518. Step 518 may include determining if the service codes include one or more domestic service codes. In the event that the service does do not include one or more domestic service codes, the process may end at step 522. In the event that the service codes do include one or more domestic service codes, the process may continue at step 520. At step 520, the process may include flagging the domestic service codes and transmitting data to one or more business associates identifying the client, the client identifier and the international service codes.

Thus, methods and apparatus for establishing and maintaining customer data integrity have been provided. Persons skilled in the art will appreciate that the present invention can be practiced in embodiments other than the described embodiments, which are presented for purposes of illustration rather than of limitation, and that the present invention is limited only by the claims that follow.

What is claimed is:

1. One or more non-transitory computer-readable media storing computer-executable instructions which, when executed by a processor on a computer system, perform a method for validating an account number, the method comprising:

- using a first receiver to receive an employee identification number input into a graphical user interface ("GUI");
- using the first receiver to receive a billing account number input into the GUI;
- using a processor to determine if the billing account number includes a number of consecutive, identical digits;
- using the processor to determine if the number of consecutive, identical digits is equal to or greater than a threshold number of consecutive, identical digits;
- in the event that the number of consecutive, identical digits is determined to be greater than or equal to the threshold number, using a transmitter to transmit a data file including the employee identification number and the billing account number to a predetermined e-mail address;
- in the event that the number of consecutive, identical digits is determined to be less than the threshold number:
  - using the processor to access a database including valid billing account numbers; and
  - using the processor to electronically identify an account number included in the database that is identical to the billing account number, wherein a failure to identify an account number identical to the billing account number triggers the processor to disable a plurality of input fields included in the GUI.

2. The computer-readable media of claim 1 wherein, in the method, the predetermined e-mail address is an e-mail address of a management employee.

3. The computer-readable media of claim 1 wherein, in the method, the plurality of input fields are required input fields.

4. The computer-readable media of claim 1 wherein, in the method, the billing account number is a bank account number.

5. The computer-readable media of claim 1 wherein, in the method, the failure to identify an account number identical to the billing account number further triggers the processor to display a text box including text, the text detailing the invalidity of the billing account number.

6. An article of manufacture comprising a non-transitory computer usable medium having computer readable program code embodied therein, the code when executed by a processor causes a computer to determine a validity of an account number, the computer readable program code in said article comprising:

- computer readable program code for causing the computer to receive a bank account number input into the GUI;
- computer readable program code for causing the computer to determine if the bank account number includes a number of consecutive, identical digits;
- computer readable program code for causing the computer to determine if the number of consecutive, identical digits is equal to or greater than a threshold number of consecutive, identical digits;
- in the event that the number of consecutive, identical digits is determined to be less than the threshold number, computer readable program code for causing the computer to access a database including valid bank account numbers and determine if the database includes an entry identical to the bank account number; and
- in the event that the computer establishes the non-existence of an entry identical to the bank account number, computer readable program code for causing the computer to disable a data input functionality associated with a plurality of input fields included in the GUI.

7. The article of claim 6 wherein the bank account number is a bank account number used for billing purposes.

8. The article of claim 6 further comprising computer readable program code for causing the computer to receive an employee identification number input into the GUI.

9. The article of claim 8 further comprising, in the event that the bank account number includes a number of consecutive, identical digits equal to or greater than the threshold number of consecutive, identical digits, computer readable program code for causing the computer to transmit to an e-mail address the employee identification number and the bank account number.

10. The article of claim 6 wherein the threshold number is the integer 3, 4, 5, or 6.

11. The article of claim 6 wherein the plurality of input fields include all input fields displayed on the GUI except for an input field designated for receiving a bank account number.

12. The article of claim 6 further comprising, in the event that the computer establishes the non-existence of an entry identical to the bank account number, computer readable program code for causing the computer to suspend the generation of a verification number relating to the establishment of a customer billing account.

13. The article of claim 6, wherein the bank account number is a first bank account number, further comprising:

- computer readable program code for causing the computer to receive a second bank account number;
- computer readable program code for causing the computer to access the database including valid bank account numbers and determine if the database includes an entry identical to the second bank account number; and
- in the event that the computer establishes the non-existence of an entry identical to the second bank account number, computer readable program code for causing the computer to re-enable the data input functionality of the plurality of input fields.

* * * * *